March 17, 1936.  C. V. BERGSTROM  2,034,603

SIGNAL LENS

Original Filed Feb. 5, 1934

INVENTOR.
CARL V. BERGSTROM
BY Louis O. French
ATTORNEY

Patented Mar. 17, 1936

2,034,603

UNITED STATES PATENT OFFICE 2,034,603

SIGNAL LENS

Carl V. Bergstrom, Milwaukee, Wis., assignor to Corning Glass Works, Corning, N. Y., a corporation of New York Application February 5, 1934, Serial No. 709,723
Renewed August 24, 1935

3 Claims. (Cl. 88—82)

The invention relates to lens and more particularly to lenses used in traffic danger signals.

The general object of the invention is to provide a signal lens which may be illuminated by reflection or by direct illumination, and when directly illuminated will still maintain a substantially full field of illumination. More particularly the invention is designed to provide certain improvements over my copending application Serial No. 679,599, filed July 10, 1933. According to the present invention the lens is made in two parts, an inner part and an outer part, the outer part preferably being capable of adjustable spacing from the inner part. The inner part has reflectors mounted or incorporated thereon which cooperate with button type lenses formed as integral portions of the outer part. The advantages of the multi-part lens construction are:

1. The button lens being part of the outer lens member itself, the usual problem of cementing each lens in place is eliminated.

2. The molding problem is simplified in that there are no deep pockets to form.

3. The construction is more economical, and accidental breakage will usually be confined to the outer lens member, thus saving the expense of replacing or repairing the more expensive inner lens member.

4. The inner, preferably clear glass, lens member may be used with any desired color outer lens member.

5. More light from the rear illumination source passes through the outer lens member to employ the "full diameter of illumination" because the spaces around the reflectors are open and the light does not have to pass through the side of button lens reflector pockets.

6. The reflectors may be polished at any time by removing the inner lens member from its assembly.

7. Intensity and angle of reflection may be varied by means of spacer gaskets between the two lens members.

The invention further consists in the several features hereinafter set forth and more particularly defined by claims at the conclusion hereof.

Figure 1:
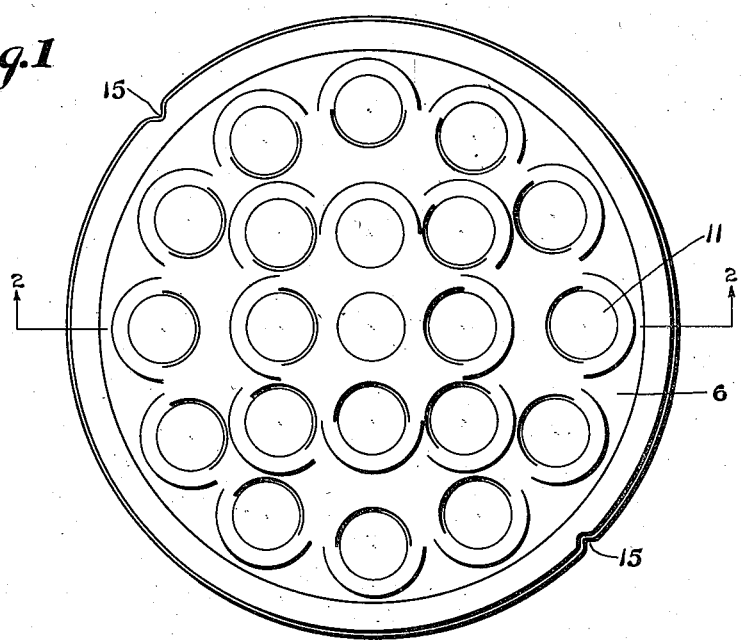
Fig. 1 is a plan view of a lens structure embodying the invention.
Figure 2:
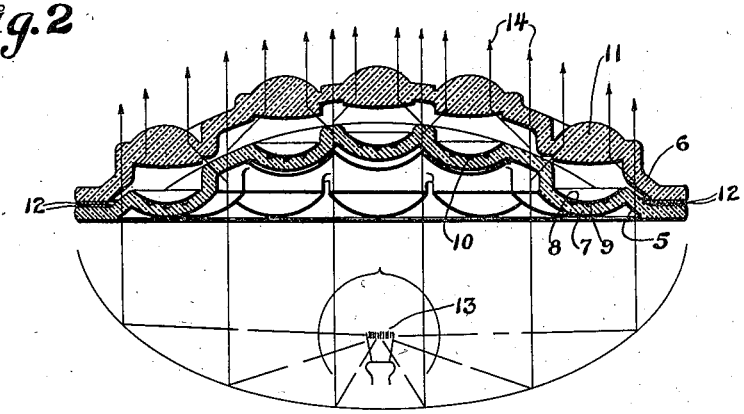
Fig. 2 is a detail vertical sectional view taken on the line 2—2 of Fig. 1.

Referring to Figs. 1 and 2, the numeral 5 designates an inner lens member formed of glass, preferably clear glass, or other suitable material, and 6 designates an outer lens member, preferably colored glass such as red or green glass or other suitable material, cooperating with the inner lens member to form the lens structure.

The inner lens member 5 is provided with a plurality of recesses or shallow pockets 7 in which opaque reflectors 8 are mounted. Each reflector 8 may be cemented to the lens 5 by cement 9 having portions thereof disposed in grooves 10 in said lens or the reflectors may be molded into the lens during the casting operation.

The outer lens member includes a series of buttontype lenses 11 formed integral with the rest of this lens member and so disposed thereon as to line up with the reflectors 8 in the pockets 7 of the inner lens member 5. Each reflector is preferably a conically curved sheet metal stamping, either silver or chromium plated.

When the two lens members 5 and 6 are assembled together, the reflectors are lined up or keep the focus with the button lenses 11 in the outer lens member by means of a suitable centering device such as notches 15 in the lens edges. The outer and inner lens members are preferably not cemented together, but are clamped together when assembled into a suitable signal housing. Spacers or gaskets 12 of varying thickness may be inserted between the lens members to vary the focus of the button reflectors. Shallow focus or small spacing favors angle of reflection, and deep focus or wider spacing favors intensity of reflection. The lens members 5 and 6 are each of generally convexly curved form.

Figure 3:
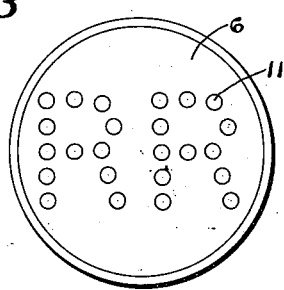
Fig. 3 is a detail plan view showing a modification.

The light from the head light beams of an automobile are reflected by the reflectors 8 back through the lens portions 11 of the outer lens member 6 and intensified by the action of these lenses in the usual manner, focal distance being varied as previously described by the use of the spacers 12. The lens portions 11 may be arranged in the form of letters or indicating symbols of various kinds. For example, I have shown in Fig. 3 a lens provided with buttons arranged to form the letters "RR" to be used as a warning for a railroad crossing.

When the full diameter illumination of the lens is desired the light rays from a lamp source, such as 13, find their way through the whole lens structure in spite of the opaque inserted reflectors since the light may pass through the portions of the inner lens bounding these reflectors and then through the button lens portions 11 and the bounding portions of such lenses of the outer lens member 6 as shown by the arrows 14. If now for any reason the light source should be cut out, the lens structure immediately becomes a reflecting signal, and the button lens portions 11 are used with the lens body as a support. If the illumination of the signal is not too bright, the light beams of car head lights will, upon contacting the reflecting part of the lens build up the intensity of the signal considerably. This makes it possible to use lamps of lower voltage than usually employed in traffic danger signals, and it will also provide a signal having a flashing effect to the driver's vision.

The invention is not to be limited to any particular form or arrangement of parts except in so far as such limitations are included in the claims.

All claims made herein are restricted to two separate elements, one having a plurality of reflectors and the other having a plurality of lenses carried thereby, as claims not so limited are made in my said other application Serial No. 679,599.

What I claim as my invention is:

1. In a device of the character described, the combination of an inner lamp lens member, and an outer lamp lens member, said inner lens member having reflectors mounted thereon, said outer lens member having smaller lens formed in it cooperating with said reflectors to form a plurality of reflecting units, said lens members having light conductive spaces between said reflectors and smaller lenses, in light conductive relation with portions of said inner lens, said lens members and said spaces providing light conductivity through the entire assembly.

2. In a device of the character described, the combination of an inner lamp lens member provided with recesses, reflectors mounted in said recesses, and an outer lamp lens having a plurality of button type lens formed therein and focally spaced from said reflectors to form a plurality of reflecting units, said inner lens having portions in light conductive spaced relation with the button lenses and spaces therebetween of the outer lens to provide complete lamp illumination thereof.

3. In a device of the character described, the combination of an inner lamp lens member having a generally convexly curved surface provided with recesses, reflectors mounted in said recesses, and an outer lamp lens having a plurality of button type lenses formed therein and focally spaced from said reflectors to form a plurality of reflecting units, said outer lens having a generally convexly curved contour, said inner lens having portions in light conductive spaced relation with the button lenses and spaces therebetween of the outer lens to provide complete lamp illumination thereof.

CARL V. BERGSTROM.